Oct. 30, 1956  T. L. TITUS  2,768,573
COFFEE BREWER
Filed July 14, 1952  3 Sheets-Sheet 1
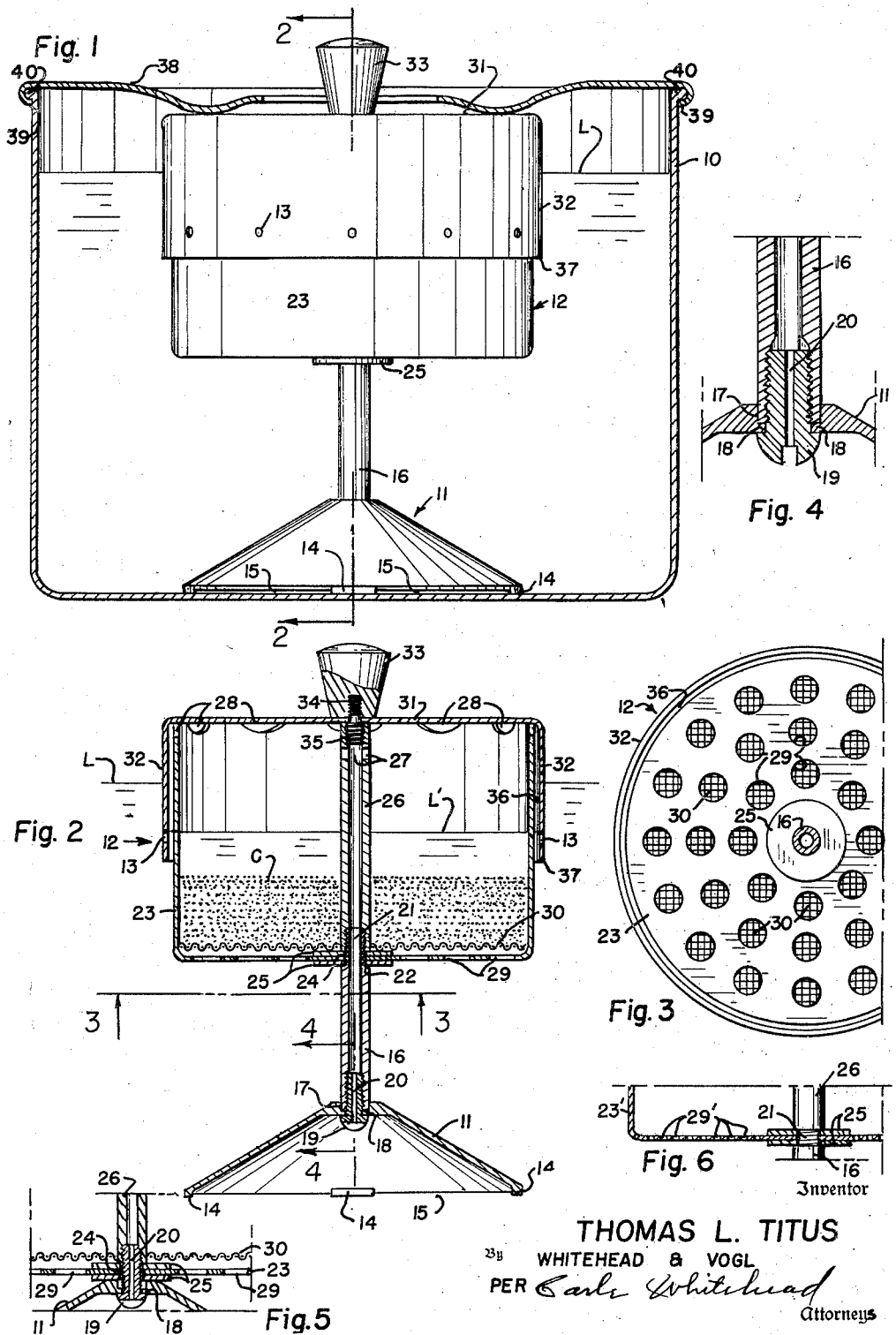
Inventor
THOMAS L. TITUS
By WHITEHEAD & VOGL
PER Earle Whitehead
Attorneys Oct. 30, 1956

T. L. TITUS 2,768,573

COFFEE BREWER

Filed July 14, 1952

Inventor
THOMAS L. TITUS
By WHITEHEAD & VOGL
PER *Earle Whitehead*
Attorneys Oct. 30, 1956 T. L. TITUS 2,768,573
COFFEE BREWER
Filed July 14, 1952 3 Sheets-Sheet 3

Inventor
THOMAS L. TITUS
By WHITEHEAD & VOGL
Per *Carl Whitehead*
Attorneys

United States Patent Office 2,768,573
Patented Oct. 30, 1956

2,768,573

COFFEE BREWER

Thomas L. Titus, Denver, Colo.

Application July 14, 1952, Serial No. 298,735

5 Claims. (Cl. 99—308)

This invention relates to infusion-making apparatus and more particularly to a new and improved apparatus for making beverages such as coffee, tea or for making other infusions. Hereinafter, for brevity, the beverage or infusion will be referred to as liquid coffee, the base substance as coffee, and what remains of the base substance, after the essence has been extracted, as grounds, it being understood that my apparatus may also be used to prepare many other types of infusions.

This application is a continuation-in-part of my application filed March 9, 1950, Serial No. 148,592, which matured into Patent No. 2,628,553, issued February 17, 1953, to include subject matter therein disclosed but not claimed.

Objects of this invention are to provide: (a) a new and improved liquid coffee making apparatus in which coffee is repeatedly flushed by water at a selected temperature, slightly less than the boiling point; (b) a new and improved coffee making apparatus, having a chamber for holding a charge of coffee, which apparatus may be placed in any ordinary vessel containing water to brew liquid coffee by application of heat to the vessel; (c) a new and improved coffee making apparatus having a coffee-holding chamber combined with a steam generating base, adapted to draw into and expel from the chamber a quantity of water in repeated cycles of operation; (d) a new and improved coffee making apparatus in which a charge of water continually steeps while successively flushing coffee within the apparatus in a manner and at a temperature which permits an efficient brewing of a clear liquid coffee from the coffee; (e) a new and improved coffee making apparatus including an element having a chamber for holding a charge of coffee and an improved vessel wherein the element may be placed and in which heat applied to the element is controlled in the desired manner for the brewing operation; and (f) an apparatus of the class described which is simple, compact and rugged in construction, without operatively moving parts, economical in operation and adapted for use over a long period of time.

With these and other objects in view, all of which more fully hereinafter appear, my invention comprises certain new and novel constructions, combinations and arrangements of parts and elements as hereinafter described, and as defined in the appended claims and illustrated, in preferred embodiment, in the accompanying drawing, in which:

Figure 1 is an elevation view of my improved coffee making apparatus placed within a vessel containing sufficient water to initiate operation of the apparatus when the vessel is heated.

Figure 2 is a sectional elevation of the apparatus viewed from the indicated line 2—2 at Fig. 1.

Figure 3 shows the underside of the chamber as viewed from the indicated line 3—3 at Fig. 2.

Figure 4 is a fragmentary sectional detail, on an enlarged scale, as viewed from the indicated line 4—4 at Fig. 2.

Figure 5 is a fragmentary sectional view similar to a portion of Fig. 2, but showing the elements thereof interconnected by an alternate construction.

Figure 6 is a fragmentary sectional view of the bottom of the container showing an alternate construction.

Figures 8 to 12 inclusive, show half elevation—half sectional views of the coffee making apparatus placed within a vessel, the different figures depicting various stages of water movement with the apparatus in use.

Figure 13:
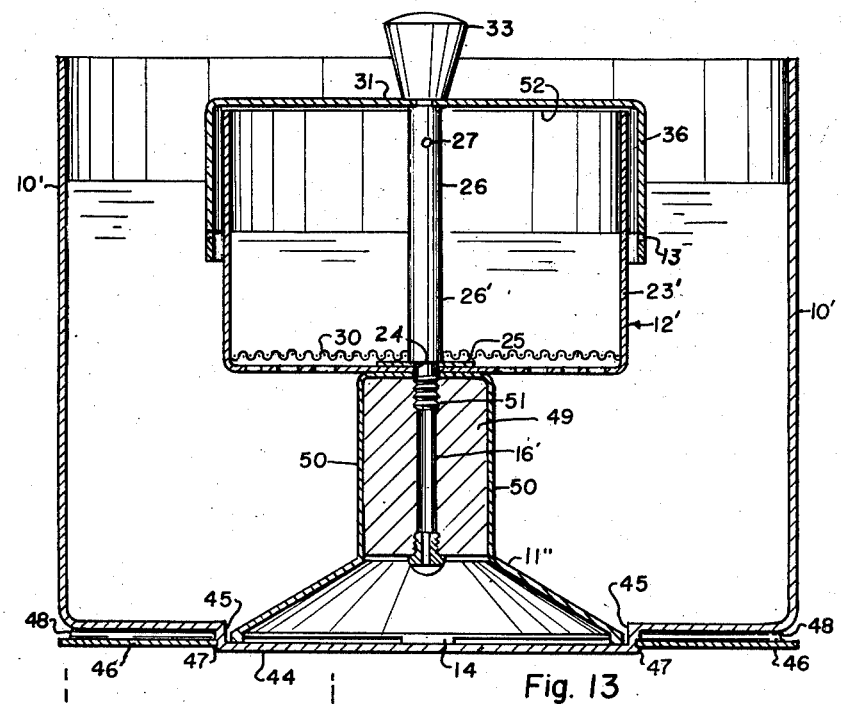

Figure 13 is a sectional elevation of an alternate construction of my apparatus placed within a vessel which incorporates features especially adapted for use with my coffee making apparatus.

Figure 14:
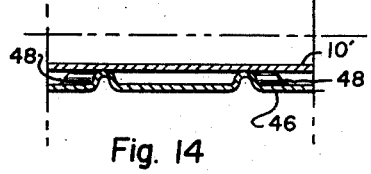

Figure 14 is a fragmentary sectional detail, on an enlarged scale, of the vessel construction as taken on the indicated line 14—14 at Fig. 13.

Figure 15:
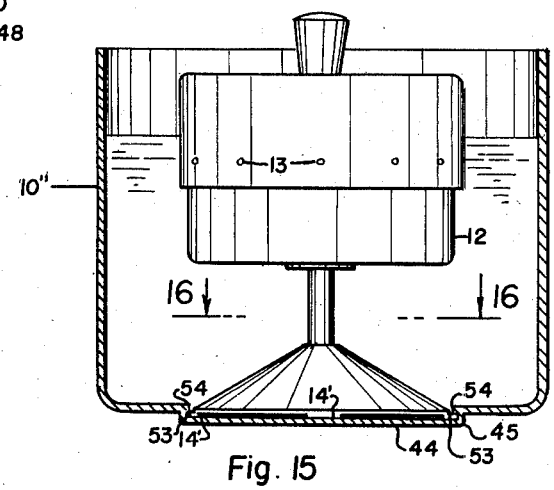

Figure 15 is an elevation view of my improved coffee making apparatus placed within a vessel especially adapted for use with the apparatus showing therein specially constructed interconnecting means.

Figure 16:
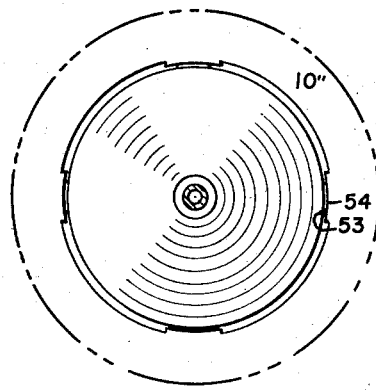

Figure 16 is a sectional plan as viewed from the indicated line 16—16 at Fig. 15.

In the art of brewing coffee, it is best to steep the coffee in water having a temperature less than boiling and preferably between 180 and 190 degrees, for certain characteristics which make liquid coffee desirable are most effectively leeched from the coffee at such temperatures. The more common practice of brewing liquid coffee with boiling water leeches from the coffee undesirable elements and at the same time evaporates and thus loses some of the desirable characteristics. A great variety of coffee making devices have been introduced from time to time, and all employ the boiling action to cause the water to flow over or percolate through a charge of coffee, but each of such methods has several disadvantages. In vacuum type coffee making apparatus, where a charge of hot water is forcibly drawn through the coffee, the coffee must be finely pulverized to permit efficient extraction of the essence. This necessitates having a fine filter to separate the grounds from the liquid coffee, and, even with such filter, the liquid coffee will have a muddy appearance. In percolator-type coffee makers, where boiling water flows upon and through a charge of coffee, the best flavor cannot be obtained. Many types of coffee making apparatus permit a flow of water through the coffee only once and that at boiling or near boiling temperatures. These allow insufficient time to leech out the desired elements, while, at the same time, undesirable elements are leeched out because of high temperatures, and, moreover, the boiling water even causes loss by evaporation of certain desirable elements.

The present invention obviates the disadvantages inherent in existing coffee making devices, including those above mentioned. It permits more effective brewing, especially of the coarser grinds, of coffee and obtains a clear liquid coffee by continuous steeping and continuous flushing in reverse directions of the coffee with water which is maintained at a selected temperature level, preferably between 180 and 190 degrees.

My invention provides, in combination with a vessel 10, a coffee infusion making apparatus, having a steam generating base 11 communicating with a chamber 12, having ports 13, wherein a charge of coffee C may be placed. The construction of the elements, constituting this base 11 and chamber 12, is such that repeated cycles of steam generation and condensation will cause water from the vessel 10 to flow into and out of the chamber, all as hereinafter described in detail.

In the illustrated embodiment of my invention, the vessel 10 is shown as a simple, flat-bottom pan adapted to hold water to a water level L.

The steam generating base 11 is formed as a flattened, circular cone having bosses 14 depending from its rim. With the base 11 placed in the vessel 10, the bosses 14 rest upon the bottom of the vessel and provide narrow slots 15 underneath the rim which permit a restricted movement of water between the vessel 10 and the interior of the base 11.

The communication of base 11 with the chamber 12 is through a steam tube 16 upstanding from the apex of base 11. The wall of the base, at the apex, is thickened enough to provide a recess 17 in which one end of the steam tube 16 is seated. This end of the tube 16 seats upon an annular shoulder 18 at the bottom of the recess 17, and is affixed to the shoulder 18 and held in recess 17 by a lock screw 19 threaded into the tube 16 from beneath shoulder 18, the head of screw 19 abutting against the underside of shoulder 18. Screw 19 has a central bore 20 which provides a restricted passage between base 11 and the tube 16, the bore being of a size adapted to regulate the flow of steam through the unit in the manner hereinafter described.

The upper end of tube 16 is threaded and reduced in outside diameter to form a boss 21 and provide a shoulder 22. Chamber 12 includes a container 23, illustrated as a flat bottomed, cylindrical cup, which has an orifice 24 centrally in its bottom, which bottom, surrounding the orifice, is reinforced by upper and lower washers 25. The orifice and washers fit over the boss 21 and seat on shoulder 22. Upstanding in container 23 is a continuation tube 26, threaded onto boss 21 and thereby against upper washer 25, thereby locking the container to tube 16. Tube 26 extends to the top of the container and is provided, near its top, with discharge orifices 27 above which it is internally threaded to receive stud 35, later described.

For communication between the interior of vessel 10 and the interior of container 23, the top edge of the container has a plurality of scallops 28 and its bottom has a plurality of orifices 29 generally larger than the coffee particles. A filter screen 30 is seated upon upper washer 25 and thereby spaced from and above the container bottom, the outer periphery of the screen being supported by a tight fit against the container wall or by any other suitable means. The screen may be dispensed with by an alternate construction, illustrated at Fig. 6, wherein the orifices 29' are small enough to prevent passage of coffee particles therethrough and numerous enough to permit adequate flow of water.

A cover, having a top portion 31 and an annular flange 32 depending therefrom, loosely telescopes over the container, completing the chamber 12. The stud 35, above mentioned, is adapted to be threaded into the top end of tube 26 and has a threaded boss 34 which upstands through the top 31 and onto which a knob 33 is threaded and thereby tightly secured to the cover, whereby the cover may be placed over the container, stud 35 inserted into the upper end of tube 26 and knob 33 manually spun to thread stud 35 into tube 26 until the top 31 is seated on the upper edge of container 23, thereby closing the top of the container, except for the scallops 28 and the space 36, afforded by the loose fit, between the wall of the container and the flange 32, the flange being provided with ports 13 at a predetermined position as hereinafter explained.

To brew liquid coffee, the operation is as follows. A charge C of coffee is placed in the container 23 and the cover 31—32 is screwed into closed position. The top level of the coffee charge C should be below the level of the lower edge 37 of flange 32. The charged unit is then placed in the vessel 10 which is filled with water to a level L which may partially or completely submerge chamber 12, but must as least be above the ports 13. The water from the vessel enters the chamber to a level L' which is initially the same as the level of the ports 13.

When the base and chamber are filled with steam, the unit will float within the vessel. Accordingly, anchor means must be provided and such means comprise a clip 38 which is adapted to span the opening of the vessel 10 and project downwardly against the cover 31 to hold the unit against the bottom of the vessel. This clip 38 is fastened to the vessel in any conventional manner, as by curled ends 39 engaging the rolled rim 40 of the vessel. At Figs. 8 to 12 inclusive a modified construction is illustrated. Here a clip 38' has its end seated in recesses 40' in the wall of vessel 10.

Heat is applied to the steam generating base as by a spot type burner 41 which is placed underneath the vessel directly beneath, and within the area of, the base 11. The water within this base is heated to the boiling point and heat is transferred to the water within the vessel outside the base. It follows that the rate at which this water is heated may be so controlled that water within the base will boil when the water outside the base is still below the boiling temperature. The heat is adjusted (by an operator or by suitable controls) to permit boiling in the base and at the same time hold at a selected temperature the body of water outside the base, such temperature being between 180 and 190 degrees for the brewing of coffee.

Figure 8:
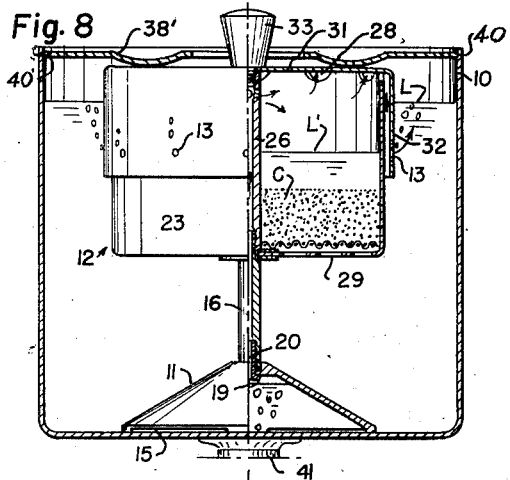

As the water within the steam generating base commences to boil, the operation of the unit will begin. First there is movement of steam up the tube 16 and into chamber 12, thus ejecting the air from the chamber. This phase, initiating the action, is represented by Fig. 8. As the air is ejected, and as the steam continues to be generated in the base 11, the water level L' rises and lowers responsive to intermittent condensation of steam flowing into the chamber, all until a point is reached at which all air is ejected from, and steam substantially fills, the chamber above the coffee.

Figure 9:
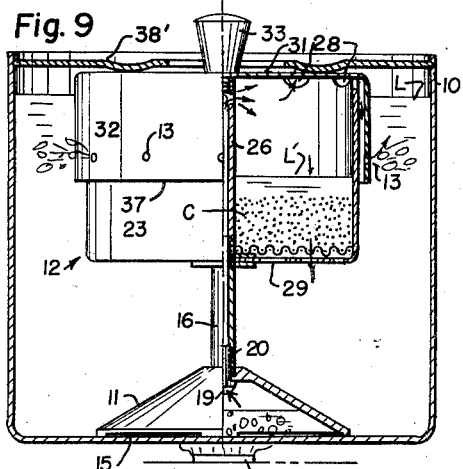
Figure 10:
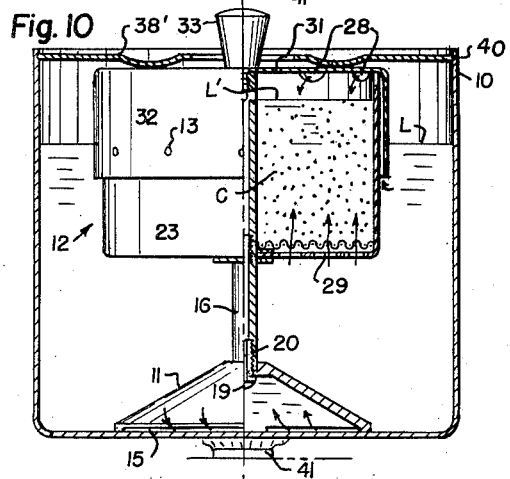

As soon as this steam lowers the level L' below the ports 13, a blow-off cycle occurs, as represented by Fig. 9. This blow-off action reduces the pressure in the chamber and in the base, and it follows that water will flow into the base through slots 15 beneath its bottom edge. This water, being at a temperature less than boiling, condenses the steam within the base and creates a partial vacuum which, through tubes 16 and 26, lowers the pressure in the chamber with the result that water is also drawn into the chamber from the vessel 10 which condenses even further the steam in the chamber. This causes an insurge of water through the orifices 29, which lifts and churns the coffee, and also through the space 36 and scallops 28 which further churns the coffee. This cycle is represented at Fig. 10.

Figure 11:
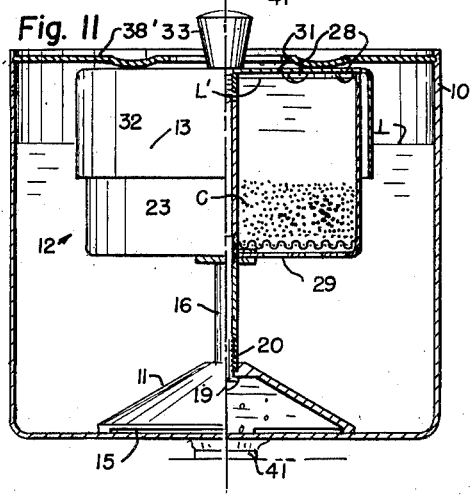
Figure 12:
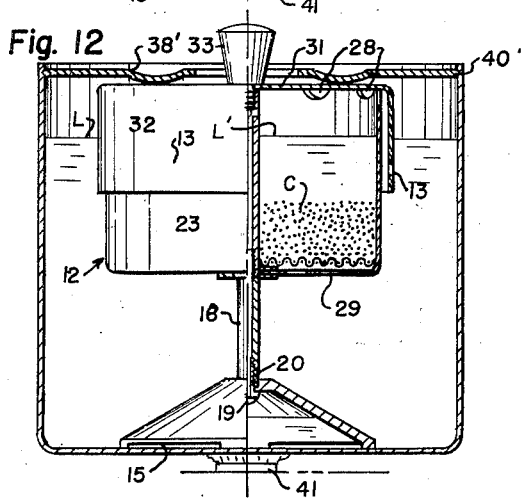

Following this cycle, the grounds settle and the container is filled with water as at Fig. 11. Then the water in the steam generating base becomes heated and commences to boil. Steam then passes through the tubes 16 and 26 and slowly displaces the water in the chamber in a flushing cycle as represented by Fig. 12. This flushing cycle continues until the water level L' is lowered to that of the ports 13 or to the lower rim 37 if the capacity of the ports is insufficient to fully discharge the steam. This reduces the pressures within the chamber and base and the blow-off cycle represented by Fig. 9 is repeated, followed by repetition of the other cycles represented by Figs. 11 and 12.

The time necessary to complete these cycles of action is controlled by the size of the orifice 20 in the screw 19 and any skilled mechanic can, by experimentation, determine the size of the orifice 20 required to produce action for any desirable period.

Various modifications of my apparatus are possible. Fig. 5 shows an alternate method of joining the base and container by eliminating the tube 16, as for brewing coffee in a shallow pan. Here the base and bottom of the coffee container are abutted together and the hollow connector screw 19 is threaded through the orifice 24 and into the continuation tube 26.

Figure 7:
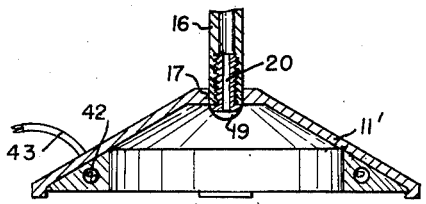
Figure 7 is a fragmentary sectional view of the steam generating base showing a modified construction having heating means integral with the base.

Fig. 7 shows an electrical heating coil 42 embedded in the wall of the conical base 11' and a suitably insulated conductor 43 extending from this base to be attached to an electrical source in any conventional manner. This arrangement permits a precise control of the heat generated within the base and is especially adaptable for use where ordinary spot heat sources are not available.

Fig. 13 shows yet another modified construction of my improved unit and a construction of a vessel 10' which is especially adapted for use with my unit. This vessel 10' has a specially constructed bottom including a central portion 44 which is depressed below the normal level of the bottom, the depressed portion 44 being formed as a cylindrical seat having side walls 45 of sufficient depth to receive the base 11'' of a unit. A shield plate 46 radially outstands from the wall 45 to extend to the outer edge of the vessel 10'. The attachment of the shield plate may be accomplished by spinning a rim 47 at the lower portion of the wall 45. The shield plate 46 is formed with a series of radially disposed corrugations 48 which space it from the bottom of the vessel. It follows that when this vessel is placed over a heat source as a conventional gas flame, where the heat cannot be concentrated as a central spot, the central depressed portion 44 receives the heat directly to be communicated to the interior of the base, while the outer portion of the bottom of the vessel receives no heat, for the plate 46 shields from the heat that portion of the bottom of the vessel which is outside the central depressed portion. With such construction my coffee making apparatus may be used on any type of burner.

The modified unit shown at Fig. 13 has a base 11'' which includes a steam tube 16' within it. The steam tube 16' is formed as a large diameter, thick walled element 49 enclosed within a tubular socket 50 which is a continuation of the conical wall of the base 11''. This thick walled element 49 is made of brass or other heavy material, and serves as a counter-weight to displace the bouyant forces which occur when the unit is filled with steam and it thereby eliminates the need of clip 38, hereinbefore described to prevent floating of the unit and hold it in position within the vessel. In this modified construction, the continuation tube 26' includes a threaded boss 51 at the bottom which is passed through the mounting orifice 24 and threaded into internal threads in the top of the element 49. The construction of the chamber 12' at the orifice 24 is the same as previously described, except that a bottom washer 25 need not be used to reinforce the container.

The continuation tube 26' in this construction extends beyond the top rim of the container 23, whereby the lid 31 is screwed against the top of the tube 26' but not against the top rim of the container 23', leaving a gap 52 between the lid and the top rim of the container. In this modified construction the scallops 28 heretofore described are unnecessary, for the gap 52 in combination with the annular space 36 provides a passage between the interior of the container and the vessel.

Another modified construction is shown at Figs. 15 and 16 in which the vessel 10'', having a depressed central portion 44, is modified in such a manner as to permit the base 11 to be affixed to the bottom of the vessel in the depressed portion 44. In this construction the bosses 14' of the base 11 include radially outstanding lugs 53 which fit against the circular wall 45 of the unit 10''. There is provided overhanging steps 54 which extend inwardly from the wall 45 at and over the lugs 53. It follows that when the unit is placed in the vessel 10'' it may be so rotated that the lugs 53 are out of registration with the steps 54 and then dropped to the bottom 44 and then rotated so as to bring lugs 53 underneath the steps 54 to hold the unit against vertical movement, thus providing a simple but effective locking of the unit in desired position.

In actual practice of this invention, certain requirements for successful operation have been noted. One of these is that water must always be maintained in the chamber above the level of the top of the coffee therein so as to assure that steam shall not contact the coffee, as it is one of the main objects of this invention to brew the coffee at temperatures substantially below the boiling point, preferably between 180 and 190 degrees so that steam, or water at boiling temperature, must be kept from contact with the coffee.

It will also be noted that while the spaces between bosses 14 have been referred to as "slots," the spaces constitute a substantially continuous opening between the bottom of base 11 and the bottom of vessel 10, the bosses 14 being just large enough to support the bottom rim of base 11 and space it away from the bottom of the vessel sufficiently to allow the desired amount of water to flow from the vessel into base 11. The aggregate area of these slots is important as is also the relation between such aggregate area and the size of orifice 20 in screw 19. Any man skilled in the art can determine the relationship by experimentation, keeping in mind the alternating operation hereinabove described, but it has been found in actual practice that with a base six inches in diameter having its roof inclined to approximately 30 degrees as indicated in the drawing and slots one thirty-second of an inch high, the orifice 20 should be approximately seven sixty-fourths of an inch in diameter to give the best results.

The slots should be as low as possible and still permit the entrance of the desired amount of water. The higher the slots are made the less steam generating space there will be within the base and the more danger of steam being emitted from the base through the slots and into the vessel and thus upsetting the desired difference in temperatures between the area within the base and the upper part of chamber 12 on the one hand and that within the vessel, but outside the unit and around the coffee on the other hand.

While I have illustrated and herein described many details of construction of the preferred embodiment of my invention, alternatives and equivalents, within the scope and spirit of my invention, will occur to those skilled in the art and accordingly it is my desire not to be limited in my protection to the details illustrated and described but only by the proper scope and spirit of the appended claims.

I claim:

1. For extracting the soluble essence from coffee and like substances, apparatus adapted to be placed within, and in combination with, a vessel adapted to hold liquid to a depth sufficient to submerge the major portion of said apparatus, said apparatus including a steam generating base and a coffee-charge holding chamber; said steam generating base being formed as an inverted cup-like unit adapted to seat upon the bottom of said vessel whereby heat applied to the bottom of the vessel will generate steam within the base without boiling liquid within the vessel outside the base, a passageway at the bottom of the base between the base interior and exterior and a tube providing communication between the top of the base interior and the chamber interior; said chamber comprising an upright cup-like container having a foraminous bottom, adapted to permit the movement of liquid into and out of said container through said bottom but to hold a coffee charge within the container and having a wall height substantially greater than the height of a normal coffee charge within the chamber, and a cup-like cover adapted to loosely telescope about the upper section of the container wall when placed thereover, the side wall lower edge of said cover terminating at a line above the top of a normal coffee charge within the chamber, and a passageway at the top of the container wall combined with the space between the container and cover walls to provide communication between the chamber interior and exterior; said tube extending through the chamber and opening into the top portion thereof and containing a restricting orifice within its passage having its internal diameter correlated with the volume of that portion of the space within the chamber above said side wall lower edge whereby, with the water level in the vessel, above said cover-wall lower edge and with steam being generated in the base, the movement of steam into the chamber effects cyclic movement of water into and out of said chamber through said bottom and coffee charge responsive to alternate supply and condensation of steam to and in the chamber.

2. The apparatus defined in claim 1 wherein said restricting orifice is formed within a cylindrical body adapted to be inserted into and fit within said tube and having said restricting orifice extending axially through said member which, otherwise, closes said tube.

3. The apparatus defined in claim 1 including a series of portholes in said cover wall spaced slightly above the cover-wall lower edge and in an array about the cover wall, and adapted to break into bubbles the steam passing out of said chamber through said communication passageway.

4. The apparatus defined in claim 1 wherein said vessel includes a heat shielding disc at the underside of its bottom having a central opening below said steam generating base whereby to restrict the flow of the beat at the underside of the vessel at the base.

5. The apparatus defined in claim 1 wherein said vessel includes a heat shielding disc at the underside of its bottom having a central opening below said steam generating base whereby to restrict the flow of the heat at the underside of the vessel at the base, said vessel including a central portion which extends through the disc central opening, said disc thereabout having radial corrugations to space it away from the bottom of the vessel.

References Cited in the file of this patent

UNITED STATES PATENTS

| Number | Name | Date |
|---|---|---|
| 65,461 | Woodward | June 4, 1867 |
| 164,182 | Kennedy | June 8, 1875 |
| 405,946 | Bulow | June 25, 1889 |
| 618,089 | Haslam | Jan. 24, 1899 |
| 648,545 | Adams | May 1, 1900 |
| 674,456 | Darden | May 21, 1901 |
| 767,595 | Pike | Aug. 16, 1904 |
| 821,124 | Savage | May 22, 1906 |
| 903,801 | Sternau et al. | Nov. 10, 1908 |
| 1,008,602 | Lake | Nov. 14, 1911 |
| 1,009,142 | Ferrall | Nov. 21, 1911 |
| 1,127,780 | Konar | Feb. 9, 1915 |
| 1,306,688 | Downham | June 17, 1919 |
| 1,588,769 | Parker | June 15, 1926 |
| 1,698,527 | Bailey | Jan. 8, 1929 |
| 1,963,012 | Barrett | June 12, 1934 |
| 2,109,363 | Williams | Feb. 22, 1938 |
| 2,224,672 | Davis | Dec. 10, 1940 |
| 2,246,061 | Nowland | June 17, 1941 |
| 2,385,132 | Graham | Sept. 18, 1945 |
| 2,628,553 | Titus | Feb. 17, 1953 |

FOREIGN PATENTS

| Number | Country | Date |
|---|---|---|
| 340,008 | France | May 2, 1904 |
| 414,645 | Italy | Aug. 20, 1946 |